June 29, 1926.
J. SLEPIAN
CREST VOLT METER
Filed Dec. 13, 1920
1,590,451
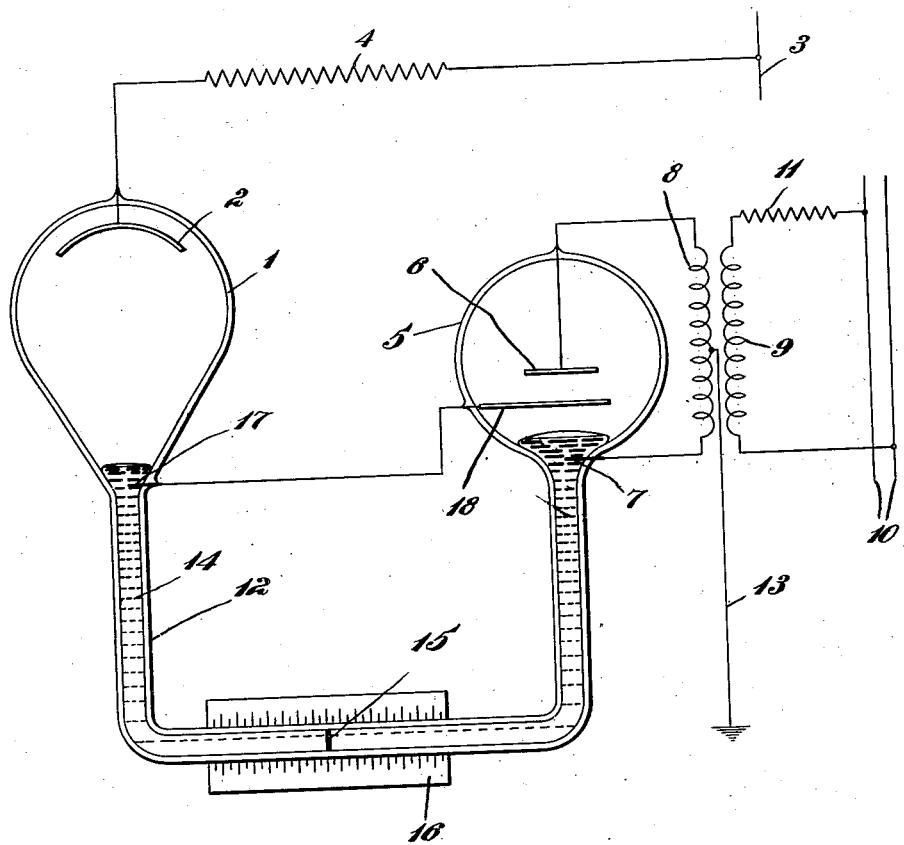
WITNESSES:
INVENTOR
Joseph Slepian.
BY
ATTORNEY Patented June 29, 1926.

1,590,451

UNITED STATES PATENT OFFICE.

JOSEPH SLEPIAN, OF SWISSVALE, PENNSYLVANIA, ASSIGNOR TO WESTINGHOUSE ELECTRIC & MANUFACTURING COMPANY, A CORPORATION OF PENNSYLVANIA.

CREST VOLT METER.

Application filed December 13, 1920. Serial No. 430,563.

This invention relates to meters and has special relation to means for, and methods of, indicating the crest or peak values of applied voltages.

One object of my invention is to provide a direct-reading measuring instrument of the above-indicated character that shall be efficient and reliable in operation.

Another object of my invention is to provide a direct-reading instrument of the above-indicated character that shall be responsive to corona action.

Heretofore, the ionization of air or gases by the presence of corona has been utilized for determining the value of relatively high voltages, but these instruments have not been of the direct-reading type. The instrument of the present invention is, however, of this direct-reading type.

The present invention comprises two glass bulbs, preferably filled with an inert gas, each of which contains an electrode adapted to be energized in accordance with the voltage of the circuit which is to be measured. These bulbs are connected together by means of a tube, preferably containing mercury, the column of mercury being divided by a suitable disc. This disc is adapted to move along said tube in accordance with the value of the applied voltage and to register such movement upon a scale in juxtaposition to said tube, said scale being suitably calibrated to indicate the peak values of the applied voltages.

My invention may be best understood by reference to the accompanying drawing, wherein the single figure is a diagrammatic illustration of circuits and apparatus embodying my invention.

Referring to the drawing, a glass bulb 1 is shown as being of conical shape at the bottom thereof. This bulb is preferably filled with an inert gas. Within the bulb is located an electrode 2, which is substantially horizontally disposed therein and is slightly curved. The electrode 2 is shown as connected, through a resistor 4, to a source of supply 3, the voltage of which is to be measured.

A second glass bulb 5, of substantially spherical shape, is also preferably filled with an inert gas. Within the bulb 5 are located terminals 6 and 7, respectively connected to the secondary coil 8 of a transformer. As shown, this coil has a connection 13 direct to ground to complete the measuring circuits.

The primary coil 9 of the transformer is connected to the supply conductors 10 of any local supply circuit, such as an ordinary 60-cycle circuit. Connected between one line 10 of the local source of supply and the primary coil 9 is a resistor 11.

The two bulbs 1 and 5 are adapted to be connected, at their lower ends, by a tube 12, containing a column of mercury 14, or other suitable current-carrying substance. The mercury column is shown as divided by a disc 15, which may be made of felt or any other desired substance. The disc 15 is adapted to be moved along said tube in accordance with the movement of the column of mercury, which movement will be controlled by the applied voltage, as will be presently described. Accordingly, in order to read the value of the applied voltage, a suitably calibrated scale 16 is shown surrounding the capillary tube 12 adjacent the disc 15. Normally, that is, when no voltage is applied, the mercury is so disposed as to cause the levels of the ends thereof to occupy the positions indicated in the bulbs 1 and 5.

In this position, the mercury in bulb 1 submerges a terminal 17, which is electrically connected to an electrode 18. The electrode 18 is located within the spherical bulb 5 and is disposed horizontally between the terminals 6 and 7.

Hence, in operation, when voltage is impressed on the electrode 2 from the source of supply 3, corona action is set up between the electrode 2 and the head of the mercury column 14 which, in turn, transmits the voltage from terminal 17 to the electrode 18. This at once sets up an arc or corona discharge between the electrode 18 and terminal 6 and also between the electrode 18 and the terminal 7. This arc will be interrupted every half-cycle, since, at the completion of each half-cycle, a zero-potential value is reached. The arc thus set up will heat the gas within the spherical bulb 5, and, by the expansion thereof, force the mercury downwardly into the tube 12, and, hence, upwardly into the conical bulb 1. This action will correspondingly move the disc 15 with respect to the scale 16.

It will be noted that, as the mercury 14 rises in the bulb 1, the surface area of the mercury increases. Hence, the necessary voltage to maintain corona action will be increasing in accordance with the increasing area of the surface of the mercury column. So long as the voltage applied to the electrode 2 is sufficient to maintain corona action between the electrode 2 and the mercury 14, current will continue to flow from the terminal 17 to the electrode 18, and an arc between this electrode and terminals 6 and 7 will occur every half-cycle to correspondingly expand the gas within the bulb 5. This will move the mercury column 14 farther into the tube 12, thus increasing the surface area of the mercury within the bulb 1, likewise moving the disc 15 farther with respect to the scale 16. Such action will continue so long as corona action continues. When the point is reached at which no corona action takes place, the mercury will tend to recede from the bulb 1 into the tube 12, but, as above described, it will be maintained at such height that no corona action will take place. Hence, at this time, the position of the disc 15, with respect to the scale 16, indicates the crest value of the voltage applied to electrode 2.

From the foregoing description, it will be apparent that I have provided a direct-reading crest volt meter, utilizing the well-known corona action which accurately indicates the peak value of the voltage.

I do not wish to be limited to the specific apparatus and circuits herein set forth, as many modifications thereof may be made within the spirit and scope of my invention. I desire, therefore, that only such limitations shall be imposed as are included in the appended claims.

I claim as my invention:—

1. In a high-voltage measuring instrument, the combination with a bulb of conical shape having therein an electrode adapted to be energized from a source of power the voltage of which is to be ascertained, a second bulb having therein the terminals of a local circuit, a tube connecting said bulbs, a column of mercury disposed within said tube and extending partially within said bulbs, a disc dividing said column of mercury and movable with respect to said tube in accordance with the movements of said mercury, and a calibrated scale for said disc, of an electrode located within said second bulb and horizontally disposed between the terminals therein, said electrode being in electrical communication with the first-mentioned bulb, whereby any corona action taking place therein will energize said electrode to set up an arc between it and the adjacent terminals to thereby force said mercury to a higher level within said conical bulb until such time as there shall be no corona action.

2. In a high-voltage measuring instrument, the combination with a bulb of conical shape having therein an electrode adapted to be energized from a source of power, a second bulb having therein the terminals of a local circuit, and a tube connecting said bulbs and having a column of mercury disposed therein, and adapted to be displaced, means dividing said column of mercury and movable therewith and an electrode located within said second bulb and horizontally disposed between the terminals therein, said electrode being operatively electrically associated with the first-mentioned electrode, whereby any corona action occurring at that electrode will energize said second electrode to set up an arc between it and the adjacent terminals to thereby move said mercury.

3. In a high-voltage measuring instrument, the combination with a bulb of conical shape having an electrode therein adapted to be energized from a source of power the voltage of which is to be ascertained, a second bulb having the terminals of a local circuit therein, means connecting said bulbs having a current-carrying substance therein that is adapted to be moved in accordance with the applied voltage, means within said substance and movable therewith, a scale for co-operating with the second means, and an electrode located within said second bulb and disposed adjacent the terminals therein, said electrode being in electrical communication with the first-mentioned bulb whereby any corona action occurring in said first-mentioned bulb will energize said second electrode to displace said substance.

4. A high-voltage measuring instrument comprising a bulb of conical shape having therein means adapted to be energized from a source of power, the voltage of which is to be ascertained, a second bulb, a tube connecting said bulbs and having a current-carrying substance therein that is adapted to be moved in accordance with the applied voltage, means within said substance and movable therewith, a scale for co-operation with said second means and an electrode located within said second bulb, said electrode being in electrical communication with the first-mentioned bulb, whereby any corona action taking place in said bulb will energize said electrode to correspondingly move said substance.

5. In combination, an enclosed vessel having a U-tube portion containing separated bodies of conducting liquids and an end chamber portion constructed to change the end-surface area of one of said liquids when the latter is moved, means for separating said liquids and permitting the transmission of a moving effect from one to the other thereof, means including an electrode in said chamber for causing space-current discharge relative to said end-surface area, and means responsive to said discharge for affecting the other liquid to move said first liquid.

6. A measuring instrument comprising a structure embodying a plurality of chamber portions connected by a tubular portion, a movable insulating body in said tubular portion, a body of conducting liquid in said tubular portion on each side of said insulating body and extending to one of said chamber portions, an electrode in each of said chamber portions in spaced relation to the liquid therein, one of said electrodes being connected to a circuit to be measured and the other being connected to, and constituting a terminal of, an auxiliary circuit, another terminal of which is connected to the liquid in the corresponding chamber, said auxiliary circuit being grounded, and an electrode disposed between the liquid and the electrode in said auxiliary circuit and connected to the other liquid.

7. A measuring instrument, comprising a chamber having a substantially horizontally disposed electrode therein adapted to be energized from a source of power, the voltage of which is to be measured, a second chamber also having an electrode therein which is in electrical communication with said first-mentioned chamber and means connecting said chambers having a substance therein adapted to be affected in accordance with the voltage applied to said first-mentioned electrode, whereby an increasing surface area of said substance is presented to said electrode to break down the corona action thereof when energized.

In testimony whereof, I have hereunto subscribed my name this 3rd day of December, 1920.

JOSEPH SLEPIAN.